(12) United States Patent
Nelson et al.

(10) Patent No.: US 10,306,824 B2
(45) Date of Patent: Jun. 4, 2019

(54) SYSTEM AND METHOD FOR DISPENSING SEEDS AND TREATMENT

(71) Applicant: Great Plains Manufacturing, Inc., Salina, KS (US)

(72) Inventors: Brent W. Nelson, Falun, KS (US); Paul Galle, Lindsborg, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 158 days.

(21) Appl. No.: 14/885,385

(22) Filed: Oct. 16, 2015

(65) Prior Publication Data

US 2016/0106025 A1 Apr. 21, 2016

Related U.S. Application Data

(60) Provisional application No. 62/065,112, filed on Oct. 17, 2014.

(51) Int. Cl.
*A01C 7/06* (2006.01)
*A01C 23/02* (2006.01)
(Continued)

(52) U.S. Cl.
CPC ............... *A01C 7/06* (2013.01); *A01C 5/064* (2013.01); *A01C 5/08* (2013.01); *A01C 23/007* (2013.01);
(Continued)

(58) Field of Classification Search
CPC ......... A01C 7/06; A01C 21/002; A01C 23/00; A01C 23/021; A01C 23/023; A01C 23/027; A01C 23/007; A01C 23/02; A01C 23/04

See application file for complete search history.

(56) References Cited

U.S. PATENT DOCUMENTS 3,394,667 A * 7/1968 Lasch ...................... A01C 7/18
                                                                111/118
3,507,233 A * 4/1970 Greig ...................... A01C 5/064
                                                                111/136
(Continued)

FOREIGN PATENT DOCUMENTS

CA    2574250       7/2007
RU    2483518 C1    6/2013

OTHER PUBLICATIONS

Seed-Specific Spray Treatment of in Furrow Chemicals, The University of Tennessee Research Foundation, Brochure, Apr. 2004, 2 pages, Knoxville, TN.
(Continued)

*Primary Examiner* — Alicia Torres
(74) *Attorney, Agent, or Firm* — Hovey Williams LLP

(57) ABSTRACT

A system for dispensing seeds and a treatment. The system includes a first tube for dispensing the seeds via a first outlet, a second tube for dispensing the treatment via a second outlet, and a first valve at an upper portion and a second valve at a lower portion of the second tube. The second outlet is located between the discs of a furrow-opening wheel. The first valve is positioned outside of the furrow during operation and controls movement of the treatment from a container into the second tube. The second valve controls release of the treatment from the second outlet into the furrow. The second valve may open and close in response to pressure exerted by the treatment in the second tube. Depending on the treatment, the valves may release the treatment on, adjacent to, or both behind and in front of the dispensed seeds.

22 Claims, 9 Drawing Sheets

(51) Int. Cl.
*A01C 5/06* (2006.01)
*A01C 5/08* (2006.01)
*A01M 7/00* (2006.01)
*A01M 9/00* (2006.01)
*A01C 23/00* (2006.01)

(52) U.S. Cl.
CPC .............. *A01C 23/02* (2013.01); *A01M 7/00* (2013.01); *A01M 9/00* (2013.01)

(56) References Cited

U.S. PATENT DOCUMENTS

| | | | |
|---|---|---|---|
| 3,730,431 A | 5/1973 | Williams | |
| 3,742,877 A | 7/1973 | Coffee | |
| 4,955,538 A * | 9/1990 | Laube | A01C 17/00 239/1 |
| 5,331,907 A | 7/1994 | Beaujot | |
| 5,673,637 A * | 10/1997 | Colburn, Jr. | A01B 79/005 111/118 |
| 6,289,829 B1 | 9/2001 | Fish et al. | |
| 6,990,911 B2 | 1/2006 | Schneider | |
| 7,096,805 B1 | 8/2006 | Wisenburger | |
| 7,270,065 B2 | 9/2007 | Conrad | |
| 7,370,589 B2 | 5/2008 | Wilderson et al. | |
| 7,694,638 B1 * | 4/2010 | Riewerts | A01C 23/007 111/118 |
| 7,717,048 B2 | 5/2010 | Peterson, Jr. et al. | |
| 7,726,251 B1 | 6/2010 | Peterson et al. | |
| 8,074,585 B2 | 12/2011 | Wilkerson et al. | |
| 8,272,339 B2 | 9/2012 | Schilling et al. | |
| 8,336,469 B2 | 12/2012 | Preheim et al. | |
| 2004/0231575 A1 * | 11/2004 | Wilkerson | A01C 7/06 111/127 |
| 2005/0223955 A1 * | 10/2005 | Fulgham | A01C 23/026 111/118 |
| 2005/0263053 A1 * | 12/2005 | Schaffert | A01C 5/062 111/189 |
| 2011/0000410 A1 * | 1/2011 | Manasseri | A01C 5/064 111/163 |
| 2012/0137942 A1 * | 6/2012 | Nikkel | A01C 5/062 111/121 |
| 2012/0260835 A1 * | 10/2012 | Stark | A01C 7/105 111/120 |
| 2013/0269578 A1 | 10/2013 | Grimm et al. | |

OTHER PUBLICATIONS

Search Report and Written Opinion dated Jan. 26, 2016 for related PCT Application No. PCT/US2015/055985, filed Oct. 16, 2015, 13 pages.
Russian Office Action dated Apr. 11, 2018 for related Russian Patent Application No. 2017112075, 7 pages.
European Extended Search Report for related EP Application No. 15850001.7, dated Feb. 21, 2018, 8 pages.
Canadian Office Action dated May 31, 2018 for related Canadian Patent Application No. 2,964,322, 5 pages.

* cited by examiner

SYSTEM AND METHOD FOR DISPENSING SEEDS AND TREATMENT

FIELD

The present invention relates to systems and methods for dispensing seeds and treatments relevant to the successful development or growth of the seeds.

BACKGROUND

It is sometimes desirable to treat seeds or the soil around the seeds with protectant, growth promoter, or other treatments relevant to the successful growth or development of the seeds. To that end, the seeds may be dispensed in a first operation and the treatment may be applied in a separate second operation, or the seeds and the treatment may be dispensed in the same operation. Similarly, the treatment may be continuously dispensed along a furrow in which the seeds have been deposited, or the treatment may be selectively dispensed so as to closely correspond with the locations of the seeds in the furrow. Modern seeding systems dispense the seeds and the treatment in the same operation so as to maximize efficiency, and selectively dispense the treatment so as to minimize waste.

In one such system, a first tube dispenses the seed and a second tube dispenses the treatment in the furrow in front of the seed. However, any of the treatment remaining in or on the second tube may drip directly onto and potentially damage the seed. In another system, a sensor may sense the dispensation of the seed, and an electronically controlled valve located at a lower end of the second tube and within the furrow may open in response to the sensed dispensation of the seed to dispense the treatment. However, the electronically controlled valve, including wires connected thereto, may be damaged by dirt or rocks in the furrow and may be difficult to access to clean, repair, or replace.

This background discussion is intended to provide information related to the present invention which is not necessarily prior art.

SUMMARY

Embodiments of the present invention solve the above-described and other problems and limitations by locating the treatment delivery tube in front of the seed delivery tube (relative to the direction of travel) so that any dripping of the treatment is less likely to land on the seeds, and locating the treatment delivery tube between the double discs of a furrow-opening wheel so that a lower portion of the treatment delivery tube and a lower valve associated therewith are shielded by the discs and therefore less likely to be damaged by dirt or rocks in the furrow. Additionally, an upper electronically controlled valve is located above the furrow during operation and a lower pressure-activated valve is located closer to or within the furrow during operation, which minimizes the potential for damage to and increases accessibility for maintenance and repair of the upper valve.

An embodiment of the system for dispensing both seeds and a treatment in a furrow along a direction of travel may comprise first and second angularly-oriented discs configured to create the furrow, a first tube, a second tube, a first electronically controlled valve, and a second valve. The first tube may be coupled with a first container containing the seeds, and may have a first outlet and may be configured to periodically dispense one or more of the seeds via the first outlet into the furrow. The second tube may be coupled with a second container containing the treatment, and may have an upper end, a lower end, and a second outlet at the lower end, wherein the second outlet may be located between the first and second angularly-oriented discs, and may be configured to dispense the treatment via the second outlet into the furrow. The first electronically controlled valve may be located at the upper end of the second tube so as to be positioned substantially outside of the furrow during operation, and may be configured to control movement of the treatment from the second container into the second tube. The second valve may be located at the lower end of the second tube so as to be positioned substantially inside of the furrow during operation, and may be configured to control release of the treatment in the second tube from the second outlet, wherein the second valve may be a check valve configured to open and close in response to a pressure exerted by the treatment in the second tube.

In various implementations of this embodiment, the seeding system may further include any one or more of the following additional features. The treatment may take the form of a liquid, a solid, a powder, a granule, or a crystal, and may be or include a type of fertilizer, an insecticide, an herbicide, a fungicide, or a growth promoter. The first and second valves may be configured to release the treatment on, adjacent to, or both behind and in front of (relative to the direction of travel) the one or more seeds. The seeding system may further include a nozzle connected to the second outlet of the second conduit and configured to spray the treatment in a substantially circular pattern around the one or more seeds. The seeding system may further include a controller configured to control the first electronically controlled valve with regard to dispensing the treatment. The seeding system may include a plurality of such seeding units.

Additionally, each of these embodiments and implementations may be alternatively characterized as methods based on their functionalities.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides a seeding system configured to both dispense seeds and dispense a treatment into a furrow in a single operation. In particular, a treatment delivery tube is located in front of a seed delivery tube (relative to the direction of travel) so that any dripping of the treatment is less likely to land on the dispensed seeds, and the treatment delivery tube is located between the double discs of a furrow-opening wheel so that a lower portion of the treatment delivery tube and a lower valve associated therewith are shielded by the discs and therefore less likely to be damaged by dirt or rocks in the furrow. Additionally, an upper electronically controlled valve is located substantially above the furrow during operation and a lower pressure-activated valve is located closer to or substantially within the furrow during operation, which minimizes the potential for damage to and increases accessibility for maintenance and repair of the upper valve.

Figure 1:
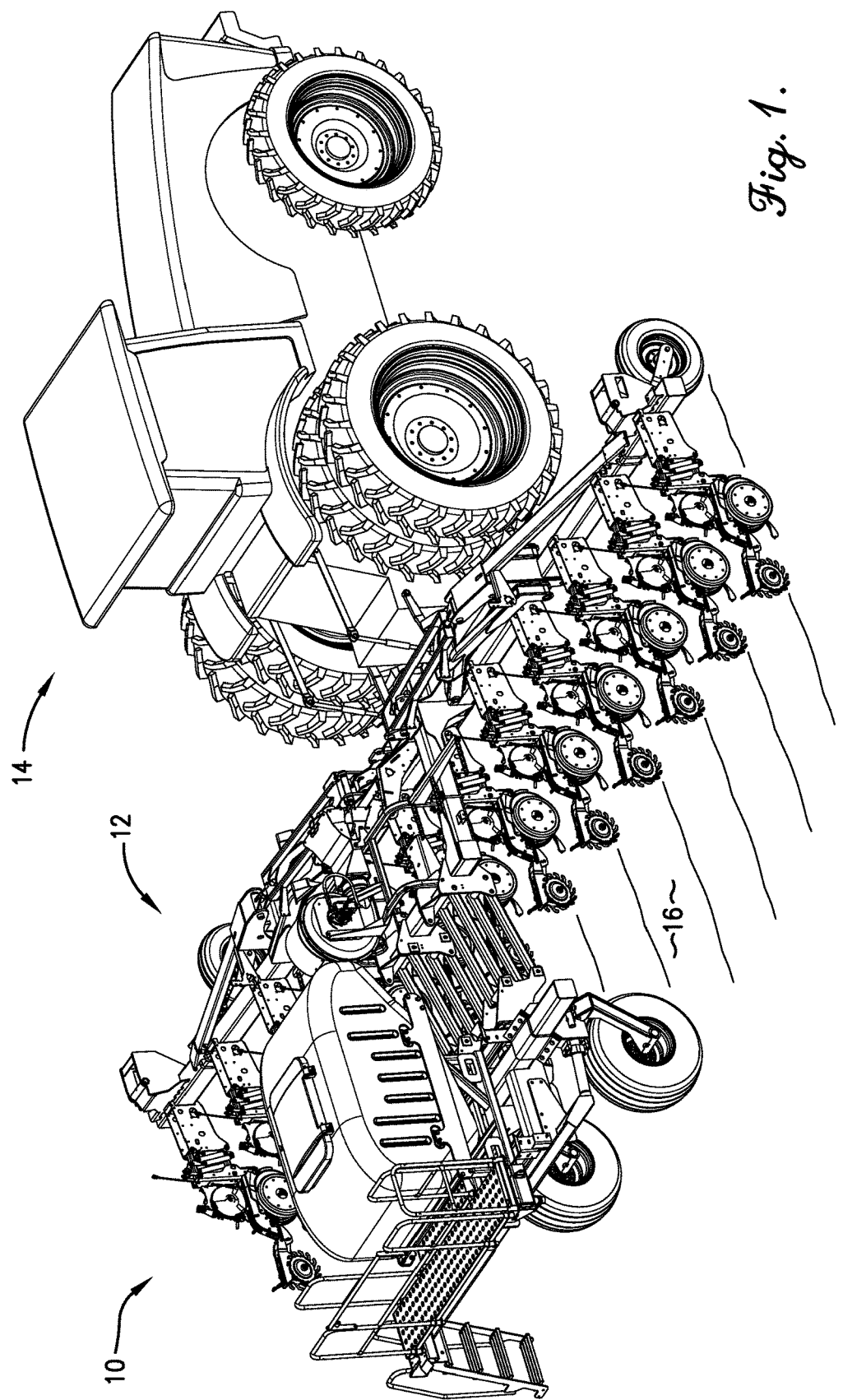
FIG. 1 is a depiction of a seeding system constructed in accordance with a first embodiment of the present invention and being towed behind a tractor over a field.
Figure 2:
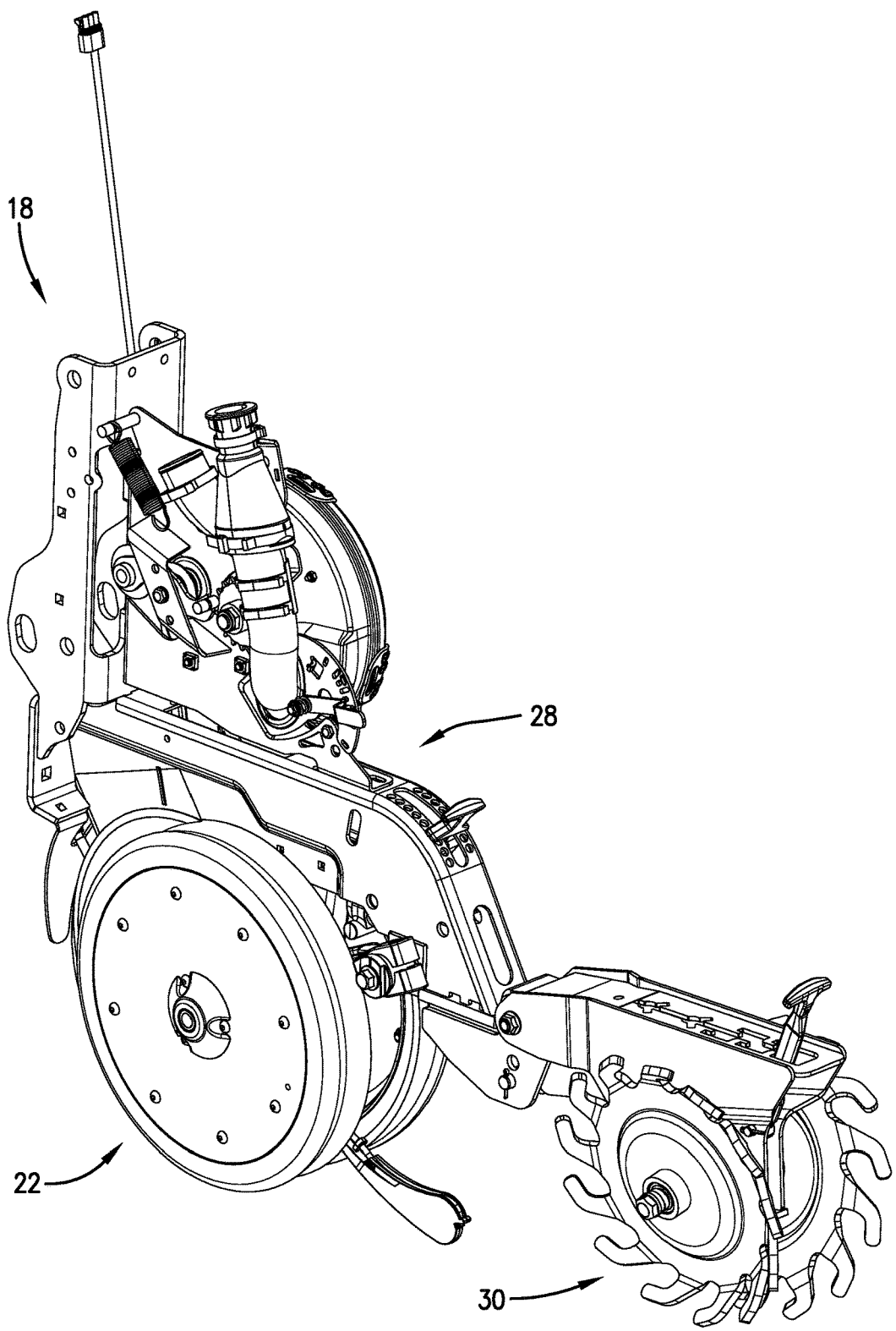
FIG. 2 is an isometric view of an implementation of a seeding unit component of the seeding system of FIG. 1, with a furrow-opening wheel and a furrow-closing wheel attached.
Figure 3:
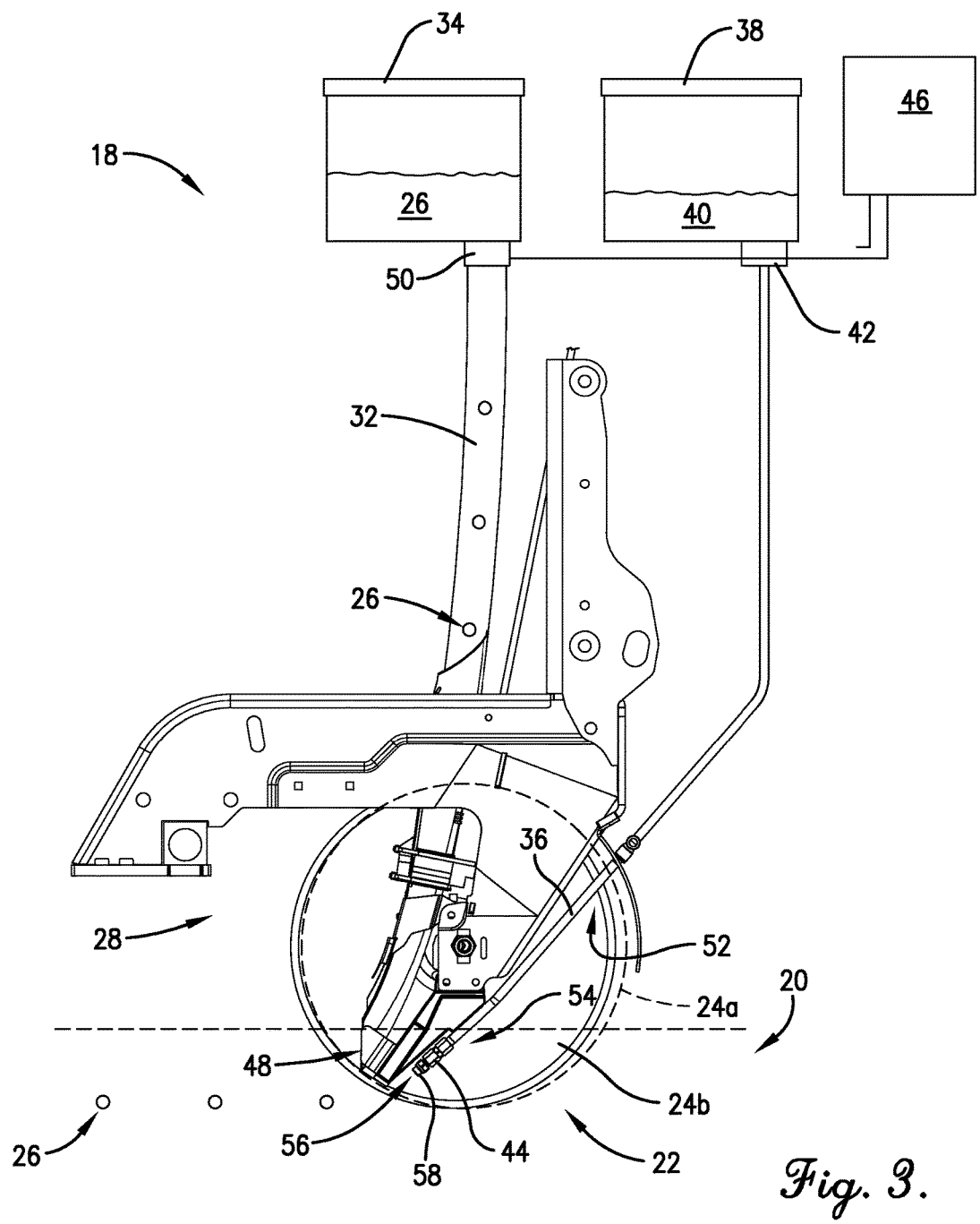
FIG. 3 is a cross-sectional elevation view of a portion of the seeding unit of FIG. 2, with the furrow-opening wheel attached.
Figure 4:
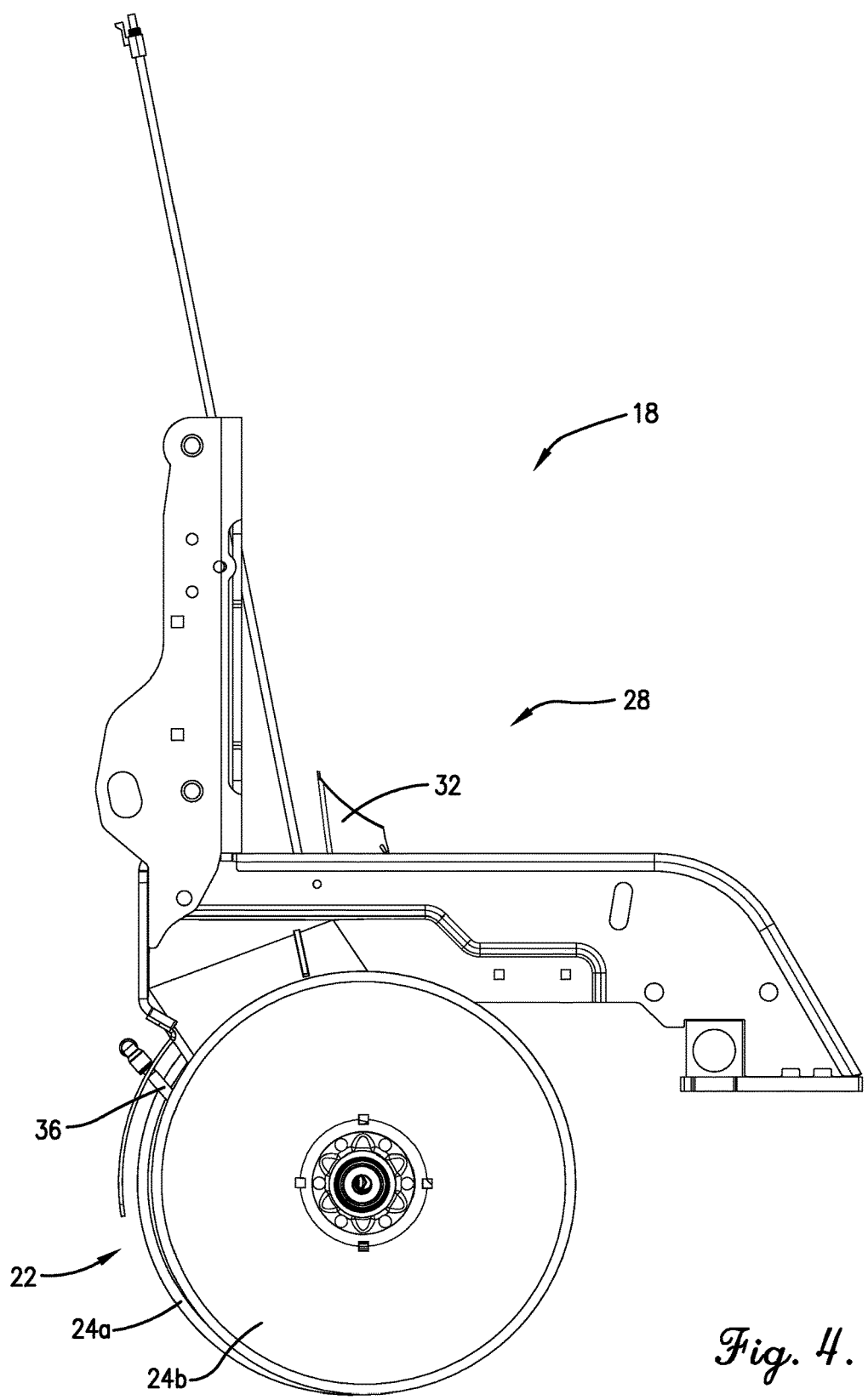
FIG. 4 is an elevation view of the seeding unit of FIG. 3, with the furrow-opening wheel attached.
Figure 5:
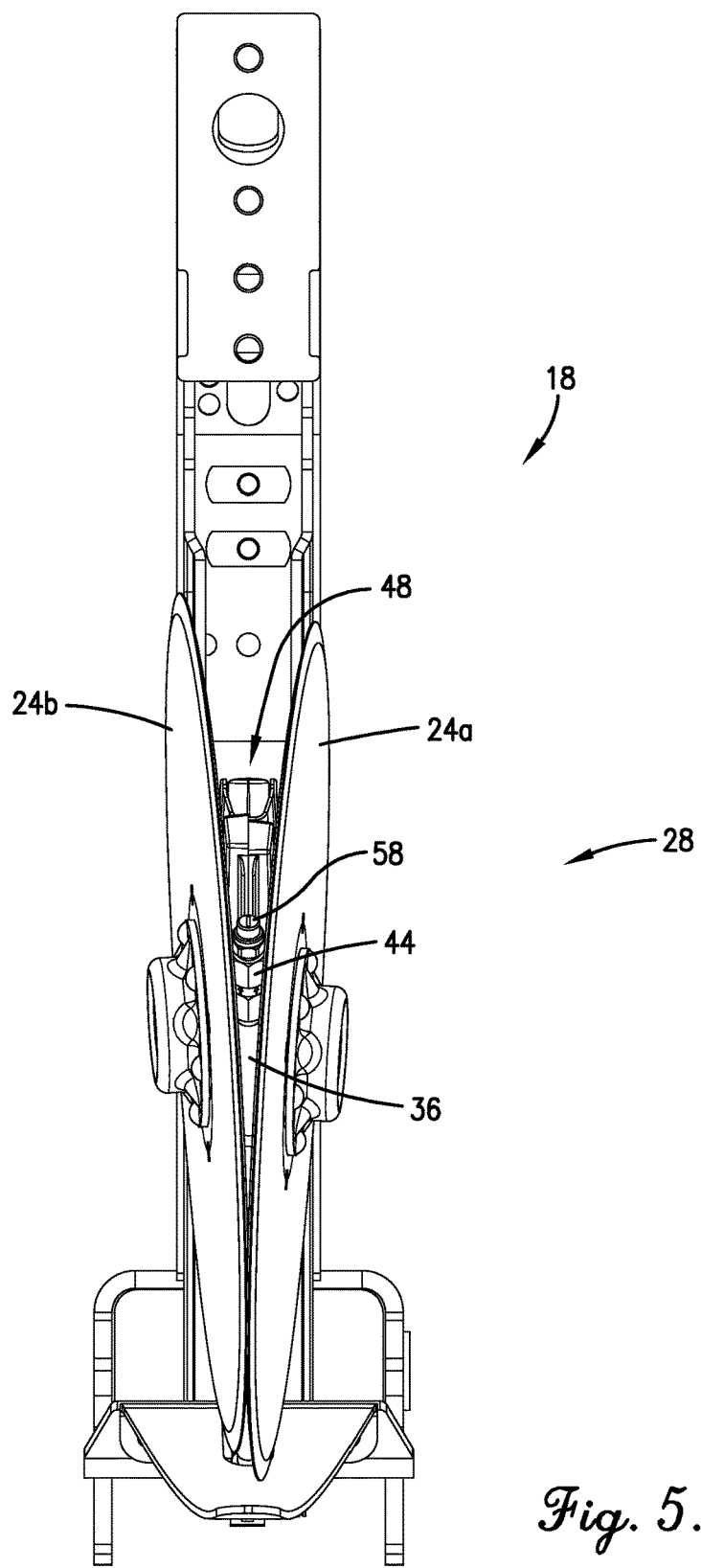
FIG. 5 is a bottom view of the seeding unit of FIG. 3, with the furrow-opening wheel attached.
Figure 6:
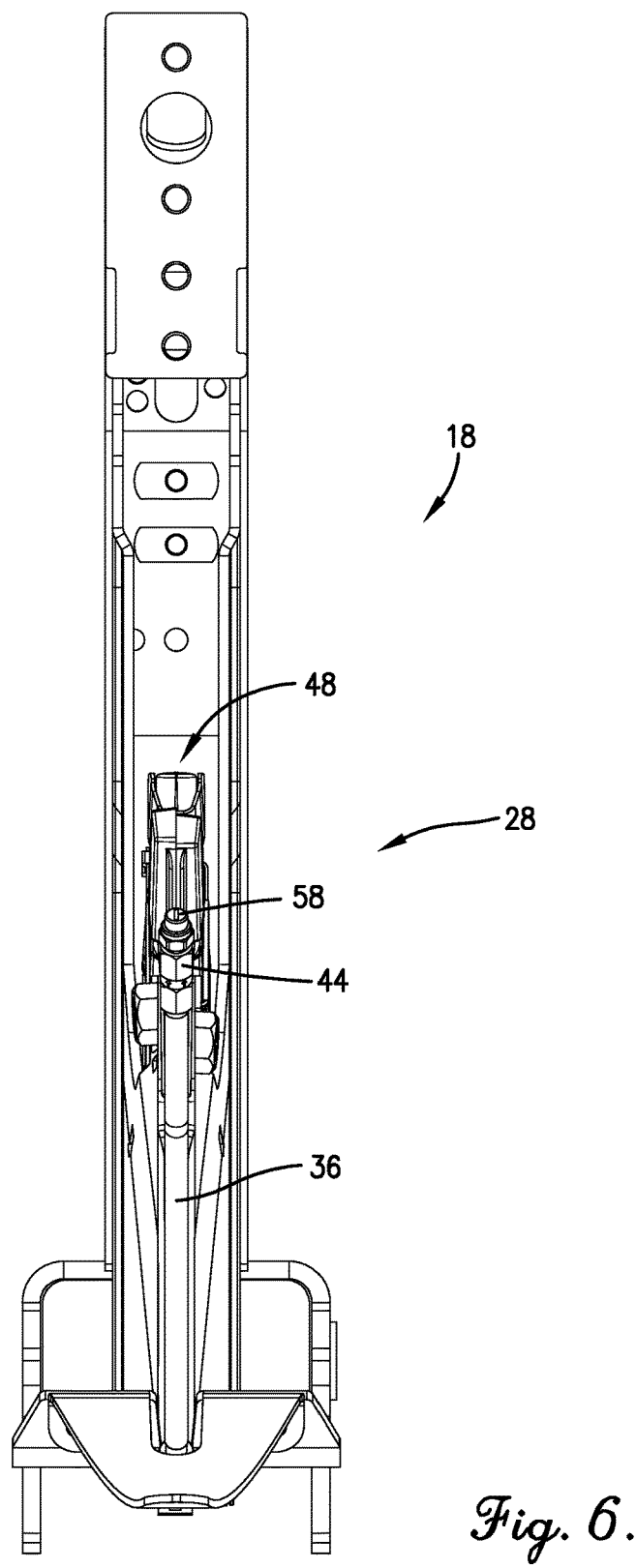
FIG. 6 is a bottom view of the seeding unit of FIG. 3, with the furrow-opening wheel removed.
Figure 7:
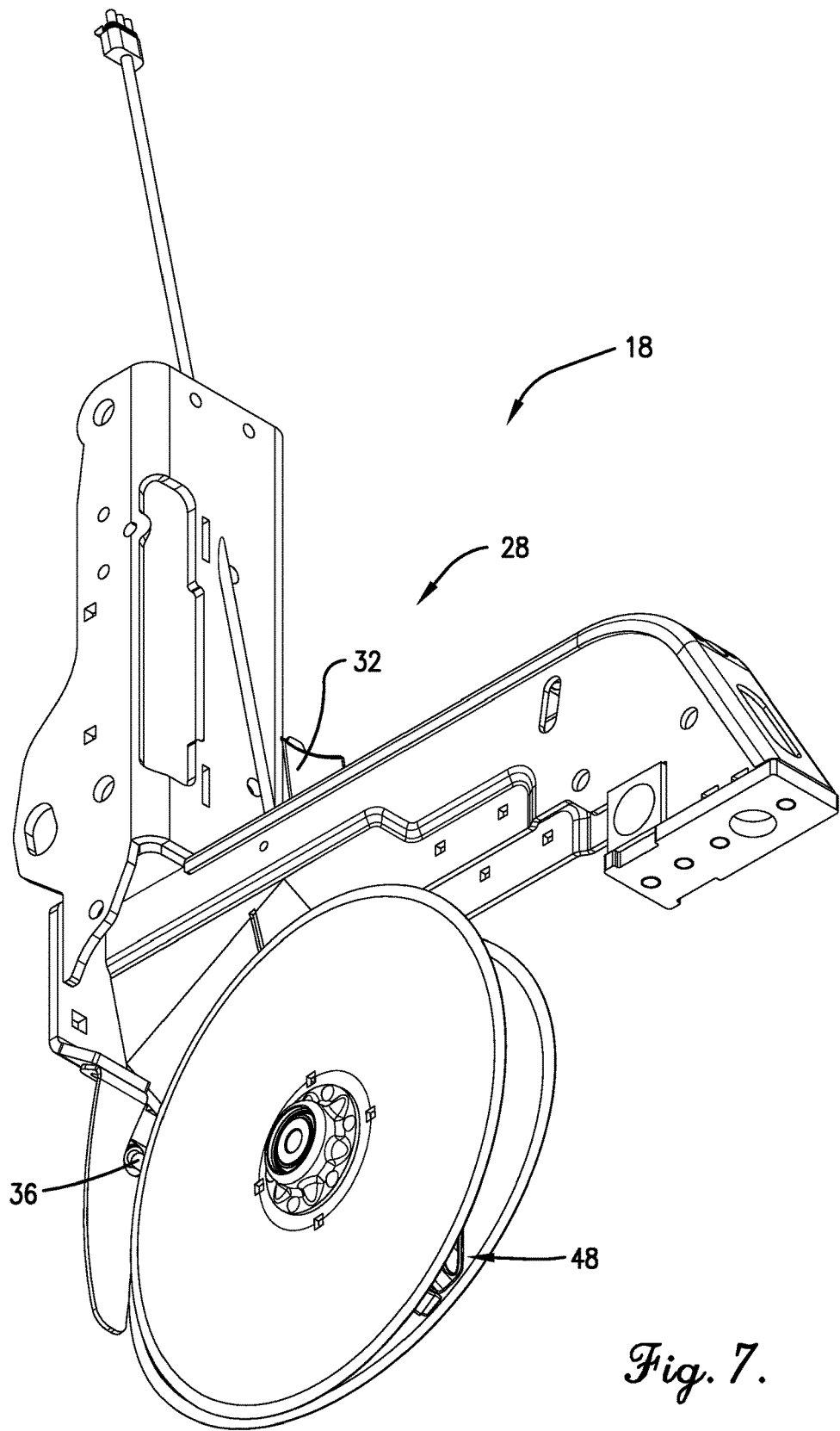
FIG. 7 is an isometric view of the seeding unit of FIG. 3, with the furrow-opening wheel attached.
Figure 8:
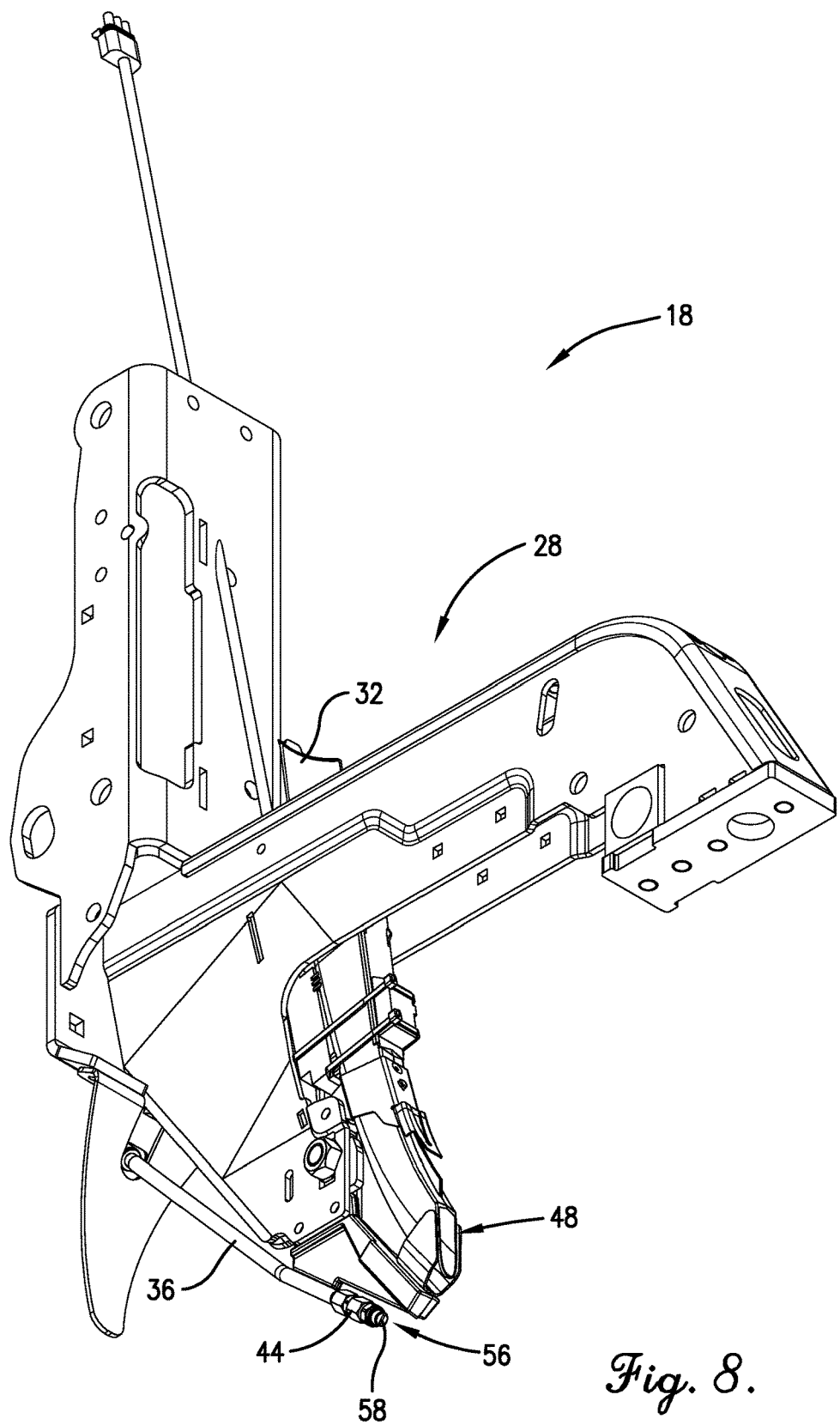
FIG. 8 is an isometric view of the seeding unit of FIG. 3, with the furrow-opening wheel removed.

Referring to FIG. 1, a first embodiment of the seeding system 10 may include a seeding apparatus 12 and may be drawn behind a tractor 14 or other vehicle in a direction of travel over a field 16. The seeding apparatus 12 may take the form of or include a row crop planter, a seed drill, or a similar apparatus configured to selectively dispense seeds. Referring also to FIGS. 2-8, the seeding apparatus 12 may include a plurality of spaced-apart seeding units 18, wherein each seeding unit 18 is configured to open a furrow 20 using a furrow-opening wheel 22 including first and second angularly-oriented discs 24a,24b or other mechanism, dispense seeds 26 and treatment into the furrow 20 using a dispensing system 28, and close the furrow 20 using a furrow-closing wheel 30 or other mechanism. In various implementations, the treatment may take the form of a liquid, a solid, a powder, a granule, or a crystal, and may be or include a type of a fertilizer, an insecticide, an herbicide, a fungicide, or a growth promoter.

The dispensing system 28 may include a first seed dispensing conduit 32 coupled with a first container 34 containing the seeds 26; a second treatment dispensing conduit 36 coupled with a second container 38 containing the treatment 40; a first electronically controlled valve 42; a second mechanically activated valve 44; and a controller 46.

The first seed dispensing conduit 32 may be a tube, channel, or other directional guide configured to guide the seeds 26 from the first container 34 into the furrow 20. The first conduit 32 may include a first outlet 48, and the dispensing system 28 may be configured to periodically dispense one or more of the seeds 26 via the first outlet 48. To that end, the dispensing system 28 may further include a metering mechanism 50 configured to control the movement of the seeds 26 from the first container 34 into the first conduit 32. In various implementations, the metering mechanism 50 may be electronically or mechanically actuated.

The second treatment dispensing conduit 36 may be a tube, channel, or other directional guide configured to guide the treatment 40 from the second container 38 into the furrow 20. The second conduit 36 may include an upper end 52, a lower end 54, and a second outlet 56 at the lower end 54. The dispensing system 28 may be configured to periodically dispense the treatment 40 via the second outlet 56. In one implementation, the second outlet 56 may be located in front of the first outlet 48 relative to the direction of travel (which is indicated by a large right-facing arrow in FIG. 3) and between the first and second angularly-oriented discs 24a,24b of the furrow-opening wheel 22. Locating the second outlet 56 between the first and second discs 24a,24b reduces the risk of damage from dirt and rocks and reduces the risk of contaminating the first outlet 48 with overspray at high rates or pressures.

The first electronically controlled valve 42 may be located at the upper end 52 of the second conduit 36 so as to be positioned substantially outside of the furrow 20 during operation, and may be configured to control the movement of the treatment 40 from the second container 38 toward the second valve 44. Locating the first valve 42 outside of the furrow 20 removes size and other design limitations and reduces the risk of damage to and facilitates cleaning and servicing the first valve 42.

The second mechanically activated valve 44 may be located at the lower end 54 of the second conduit 36 so as to be positioned substantially inside the furrow 20 during operation, and may be configured to control the release of the treatment 40 from the second outlet 56 and into the furrow 20. In one implementation, the second valve 44 may be a pressure-activated or "check" valve configured to open and close in response to a pressure exerted by the treatment 40 in the second conduit 36. Thus, in operation, the first valve 42 may allow a volume of the treatment 40 to move from the second container 38 toward the second valve 44 in response to an electrical control signal from the controller 46, and the second valve 44 may release the volume of the treatment 40 in the second conduit 36 into the furrow 20 in response to pressure exerted by the volume of the treatment 40 in the second conduit 36. Locating the second valve 44 just above the second outlet 56 facilitates controlling the inertia of the treatment 40 and reduces the risk of cavitation that might otherwise occur. Since the second valve 44 is mechanically operated (e.g., via changes in pressure), no electrical wires extend along the second conduit 36 to control the second valve 44.

In various implementations, the first and second valves 42,44 may be configured to release the treatment 40 on, adjacent to, both in front of and behind (relative to the direction of travel), or in a pattern around the one or more seeds 26. Relatedly, the dispensing system 22 may further include a nozzle 58 connected to the second outlet 56 of the second conduit 36 and configured to spray the treatment 40 in a pattern around the one or more seeds 26.

The controller 44 may be configured to control the operation of the first electronically controlled valve 42 with regard to dispensing the treatment 40 and the metering mechanism 50 with regard to dispensing the seeds 26. In various implementations, the controller 44 may include electronic hardware and/or software, may communicate control signals wirelessly or via a cable, and may take the form of a single control unit for the seeding system 10 configured to control the plurality of seeding units 18, the form of a separate control unit for each of a plurality of groups of the seeding units 18, or the form of a separate control unit for each of the seeding units 18.

In one implementation, the seeding units 18 may, in general, make their dispensations at substantially the same time. However, under certain circumstances the seeding units 18 may make their dispensations at different times. For example, when the seeding apparatus 12 is turning, the inner seeding units may move slower than the outer seeding units, so the inner seeding units may dispense with less frequency than the outer seeding units. In both cases, the controller 44 may control the timing of the dispensations.

Figure 9:
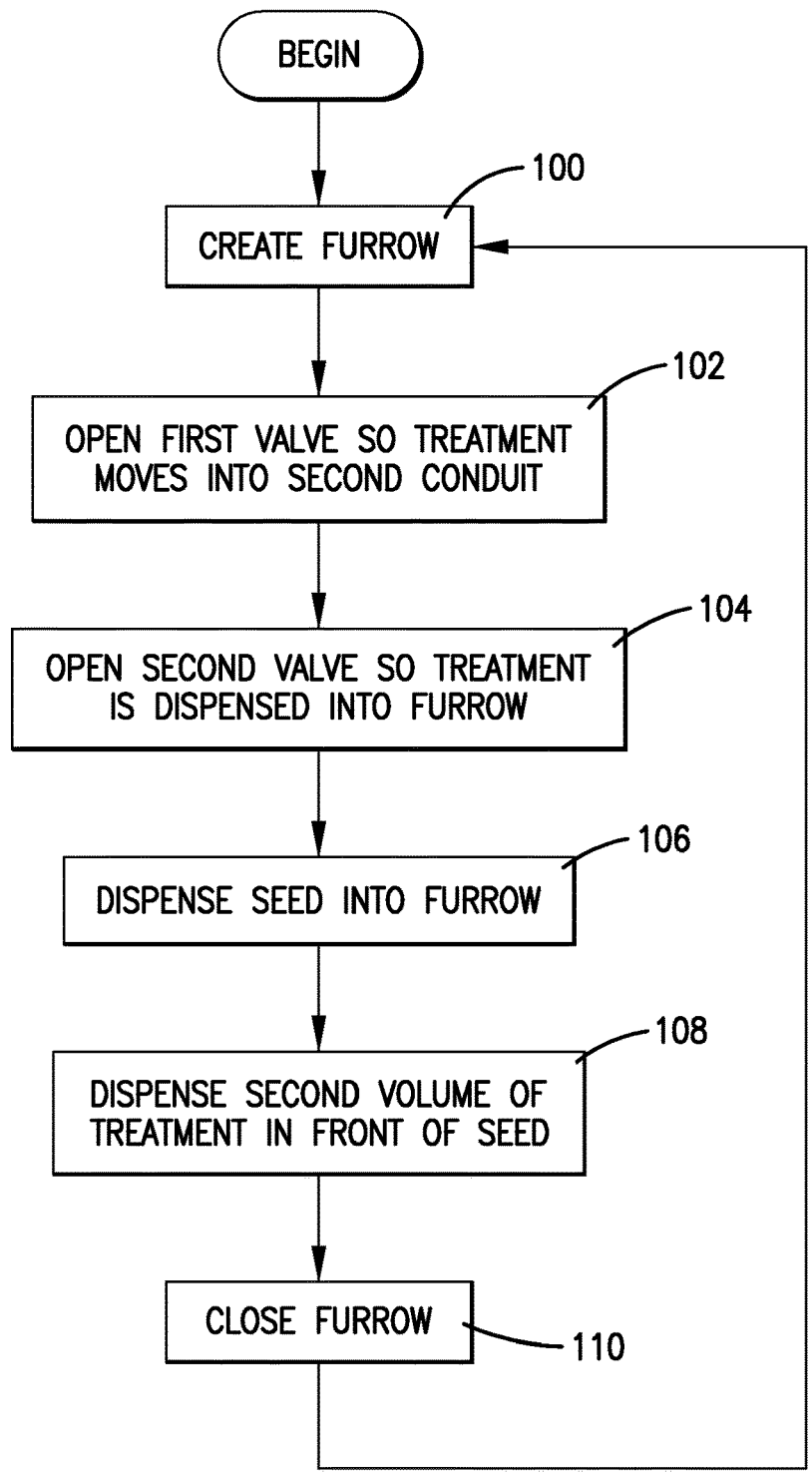
FIG. 9 is a flow diagram of steps involved in the operation of the seeding unit of FIG. 3.

Referring to FIG. 9, in operation an exemplary implementation of the seeding unit 18 may function substantially as follows. As the seeding unit 18 moves forward in the direction of travel, the furrow-opening wheel 22 may create the furrow 20 into which the seeds 26 and the treatment 40 may be dispensed, as shown in step 100. The first electronically controlled valve 42 may open to allow a volume of the treatment 40 to move from the second container 38 into the second treatment delivery conduit 36, as shown in step 102. The volume of treatment 40 in the second conduit 36 may exert pressure on the second pressure-activated valve 44, thereby causing the second valve 44 to open and dispense the treatment 40 into the furrow 20, as shown in step 104. A seed 26 may then be released from the first container 34 to move through the first seed delivery conduit 32 and be dispensed into the furrow 20, as shown in step 106. Steps 102 and 104 may be repeated to dispense a second volume of the treatment 40 into the furrow 20 in front of the seed 26, as shown in step 108. The furrow-closing wheel 30 may then close the furrow 20 over the seed 26 and the treatment 40, as shown in step 110. The entire process may then be repeated as many times as necessary as the seeding unit 18 moves across the field 16.

Thus, the present invention provides several advantages over the prior art. In particular, the treatment delivery tube 36 is located in front of the seed delivery tube 32 (relative to the direction of travel) so that any dripping of the treatment 40 is less likely to land on the dispensed seeds 26, and located between the first and second angularly-oriented double discs 24a,24b of the furrow-opening wheel 22 so that the lower portion 54 of the treatment delivery tube 36 and the lower valve 44 associated therewith are shielded by the discs 24a,24b and therefore less likely to be damaged by dirt or rocks in the furrow 20. Additionally, the upper first valve 42 is located substantially above the furrow 20 during operation and the lower second valve 44 is located closer to or substantially within the furrow 20 during operation, which minimizes the potential for damage to and increases accessibility for maintenance and repair of the first valve 42.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for dispensing both seeds and a treatment in a furrow formed by a pair of discs traveling along a direction of travel, the system comprising:
    a first conduit having a first outlet and configured to periodically dispense one or more of the seeds via the first outlet;
    a second conduit having an upper end, a lower end, and a second outlet at the lower end, and configured to dispense the treatment via the second outlet, wherein the second conduit includes a nozzle connected to the second outlet and positioned immediately forward of the first outlet with respect to the direction of travel;
    a first valve located at the upper end of the second conduit so as to be positioned substantially outside of the furrow during operation, and configured to control movement of the treatment into the second conduit; and
    a second valve located at the lower end of the second conduit so as to be positioned substantially inside of the furrow during operation, and configured to control release of the treatment in the second conduit from the second outlet,
    wherein the second valve is positioned adjacent to the second outlet to reduce cavitation of the treatment dispensed from the second conduit, wherein each of the second outlet and the second valve is positioned directly between the pair of discs, and wherein each of the second outlet and the second valve is positioned below a center of the pair of discs and located closer to a bottom edge of the pair of discs than the center of the pair of discs,
    wherein the first valve is configured to selectively permit a volume of treatment to flow into the second conduit, with such volume of treatment configured to exert a pressure sufficient for the second valve to release the volume of treatment into the furrow.

2. The system as set forth in claim 1, wherein the treatment is in a form selected from the group consisting of: liquid, solid, powder, granule, and crystal.

3. The system as set forth in claim 1, wherein the treatment is of a type selected from the group consisting of: fertilizers, insecticides, herbicides, fungicides, and growth promoters.

4. The system as set forth in claim 1, wherein the second valve is a check valve configured to open and close in response to the pressure exerted by the volume of treatment in the second conduit.

5. The system as set forth in claim 1, wherein the first and second valves are configured to release the treatment on the one or more seeds.

6. The system as set forth in claim 1, wherein the first and second valves are configured to release the treatment adjacent to the one or more seeds.

7. The system as set forth in claim 6, wherein the first and second valves are configured to release the treatment both in front of the one or more seeds and behind the one or more seeds relative to the direction of travel.

8. The system as set forth in claim 1, the nozzle is configured to spray the treatment in a pattern around the one or more seeds.

9. The system as set forth in claim 1, wherein the system further includes the pair of discs which are configured as first and second angularly-oriented discs configured to create the furrow.

10. A system for dispensing both seeds and a treatment in a furrow along a direction of travel, the system comprising:
a pair of discs comprising first and second angularly-oriented discs configured to create the furrow;
a first tube coupled with a first container containing the seeds, the first tube having a first outlet and configured to periodically dispense one or more of the seeds via the first outlet into the furrow;
a second tube coupled with a second container containing the treatment, the second tube having an upper end, a lower end, and a second outlet at the lower end, wherein the second outlet is configured to dispense the treatment via the second outlet into the furrow, and wherein the second tube includes a nozzle connected to the second outlet and positioned immediately forward of the first outlet with respect to the direction of travel;
a first electronically controlled valve located at the upper end of the second tube so as to be positioned substantially outside of the furrow during operation and configured to control movement of the treatment from the second container into the second tube; and
a second valve located at the lower end of the second tube so as to be positioned substantially inside of the furrow during operation and configured to control release of the treatment in the second tube from the second outlet, wherein the second valve is a check valve configured to open and close in response to a pressure exerted by the treatment in the second tube,
wherein the second valve is positioned adjacent to the second outlet to reduce cavitation of the treatment dispensed from the second tube, wherein each of the second outlet and the second valve is positioned directly between the pair of discs, and wherein each of the second outlet and the second valve is positioned below a center of the pair of discs and located closer to a bottom edge of the pair of discs than the center of the pair of discs.

11. The system as set forth in claim 10, wherein the treatment is in a liquid form.

12. The system as set forth in claim 10, wherein the treatment is of a type selected from the group consisting of: fertilizers, insecticides, herbicides, fungicides, and growth promoters.

13. The system as set forth in claim 10, wherein the first and second valves are configured to release the treatment on the one or more seeds.

14. The system as set forth in claim 10, wherein the first and second valves are configured to release the treatment adjacent to the one or more seeds.

15. The system as set forth in claim 14, wherein the first and second valves are configured to release the treatment both in front of the one or more seeds and behind the one or more seeds relative to the direction of travel.

16. The system as set forth in claim 10, wherein the nozzle is configured to spray the treatment on or around the one or more seeds.

17. The system as set forth in claim 10, the system further including a controller configured to control the first electronically controlled valve with regard to dispensing the treatment.

18. An agricultural seeding system for dispensing both seeds and a treatment along a direction of travel, the system comprising:
a plurality of seeding units, with each seeding unit including a pair of discs comprising first and second angularly-oriented discs configured to create a furrow, and each seeding unit configured to dispense both the seeds and the treatment into the furrow, and each seeding unit including
a first tube coupled with a first container containing the seeds, the first tube having a first outlet and configured to periodically dispense one or more of the seeds via the first outlet,
a second tube coupled with a second container containing the treatment, the second tube having an upper end, a lower end, and a second outlet at the lower end, and configured to dispense the treatment via the second outlet, wherein the second outlet is positioned forward of the first outlet with respect to the direction of travel;
a first electronically controlled valve located at the upper end of the second tube so as to be positioned outside of the furrow during operation and configured to control movement of the treatment from the second container into the second tube, and
a second valve located at the lower end of the second tube so as to be positioned inside of the furrow during operation and configured to control release of the treatment in the second tube from the second outlet, wherein the second valve is a check valve configured to open and close in response to a pressure exerted by the treatment in the second tube,
wherein the second valve is positioned adjacent to the second outlet to reduce cavitation of the treatment dispensed from the second tube, wherein each of the second outlet and the second valve is positioned directly between the pair of discs, wherein each of the second outlet and the second valve is positioned below a center of the pair of discs, and wherein the first tube passes rearward of the center of the pair of discs and the second tube passes forward of the center of the pair of discs.

19. The system as set forth in claim 18, wherein the treatment is in a liquid form.

20. The system as set forth in claim 18, wherein the treatment is of a type selected from the group consisting of: fertilizers, insecticides, herbicides, fungicides, and growth promoters.

21. The system as set forth in claim 1, further comprising:
a seed meter configured to control movement of seeds through the first conduit; and
a controller in communication with the seed meter associated with the first conduit and with the first valve associated with the second conduit, wherein the controller is configured to control the seed meter with regard to dispensing seed and the first valve with regard to dispensing treatment.

22. The system as set forth in claim 21, wherein the controller is configured to control the seed meter and the first valve, such that the system is configured to perform the following consecutive steps—
(a) deposit a first volume of treatment into the furrow,
(b) deposit, in front of the first volume of treatment, one or more seeds into the furrow, and
(c) deposit, in front of the one or more seeds deposited in step (b), a second volume of treatment into the furrow.

* * * * *